United States Patent
Taht et al.

(10) Patent No.: US 10,482,017 B2
(45) Date of Patent: Nov. 19, 2019

(54) PROCESSOR, METHOD, AND SYSTEM FOR CACHE PARTITIONING AND CONTROL FOR ACCURATE PERFORMANCE MONITORING AND OPTIMIZATION

(71) Applicant: Intel Corporation, Santa Clara, CA (US)

(72) Inventors: Karl I. Taht, Beaverton, OR (US); Christopher B. Wilkerson, Portland, OR (US); Ren Wang, Portland, OR (US); James J. Greensky, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 15/721,223

(22) Filed: Sep. 29, 2017

(65) Prior Publication Data

US 2019/0102302 A1     Apr. 4, 2019

(51) Int. Cl.

| | |
|---|---|
| *G06F 12/08* | (2016.01) |
| *G06F 12/0831* | (2016.01) |
| *G06F 12/0846* | (2016.01) |
| *G06F 12/128* | (2016.01) |

(52) U.S. Cl.
CPC ...... *G06F 12/0831* (2013.01); *G06F 12/0848* (2013.01); *G06F 12/128* (2013.01); *G06F 2212/282* (2013.01); *G06F 2212/621* (2013.01)

(58) Field of Classification Search
CPC ......... G06F 2212/621; G06F 2212/282; G06F 12/128; G06F 12/0848; G06F 12/0831; G06F 12/0864; G06F 12/127; G06F 12/0804; G06F 12/0862; G06F 2212/604; G06F 12/08; G06F 12/00; G06F 12/084; G06F 12/121; G06F 12/0808; G06F 12/123; G06F 12/0846
USPC ......................................................... 711/129
See application file for complete search history.

(56) References Cited

U.S. PATENT DOCUMENTS

| | | | | |
|---|---|---|---|---|
| 4,853,846 A | * | 8/1989 | Johnson ................ | G06F 9/3802 710/300 |
| 5,073,891 A | * | 12/1991 | Patel ...................... | G11C 29/14 714/718 |
| 5,893,920 A | * | 4/1999 | Shaheen ............. | G06F 12/0813 711/133 |
| 6,339,813 B1 | * | 1/2002 | Smith, III .......... | G06F 12/0859 711/133 |

(Continued)

*Primary Examiner* — Shawn X Gu
*Assistant Examiner* — Jean C Edouard
(74) *Attorney, Agent, or Firm* — Nicholson De Vos Webster & Elliott LLP

(57) ABSTRACT

Processor, method, and system for tracking partition-specific statistics across cache partitions that apply different cache management policies is described herein. One embodiment of a processor includes: a cache; a cache controller circuitry to partition the cache into a plurality of cache partitions based on one or more control addresses; a cache policy assignment circuitry to apply different cache policies to different subsets of the plurality of cache partitions; and a cache performance monitoring circuitry to track cache events separately for each of the cache partitions and to provide partition-specific statistics to allow comparison between the plurality of cache partitions as a result of applying the different cache policies in a same time period.

22 Claims, 16 Drawing Sheets

(56) References Cited

U.S. PATENT DOCUMENTS

| | | | | |
|---|---|---|---|---|
| 6,694,407 | B1* | 2/2004 | May | G06F 12/0842 |
| | | | | 711/129 |
| 7,558,920 | B2* | 7/2009 | Mattina | G06F 12/084 |
| | | | | 711/133 |
| 2002/0116584 | A1* | 8/2002 | Wilkerson | G06F 9/383 |
| | | | | 711/133 |
| 2007/0143546 | A1* | 6/2007 | Narad | G06F 12/084 |
| | | | | 711/130 |
| 2008/0010413 | A1* | 1/2008 | Kailas | G06F 9/30043 |
| | | | | 711/129 |
| 2010/0318742 | A1* | 12/2010 | Plondke | G06F 12/1036 |
| | | | | 711/123 |
| 2011/0145501 | A1* | 6/2011 | Steely, Jr. | G06F 12/0806 |
| | | | | 711/121 |
| 2013/0262772 | A1* | 10/2013 | Rabinovitch | G06F 12/0871 |
| | | | | 711/128 |
| 2014/0281248 | A1* | 9/2014 | Alameldeen | G06F 12/0864 |
| | | | | 711/128 |

* cited by examiner

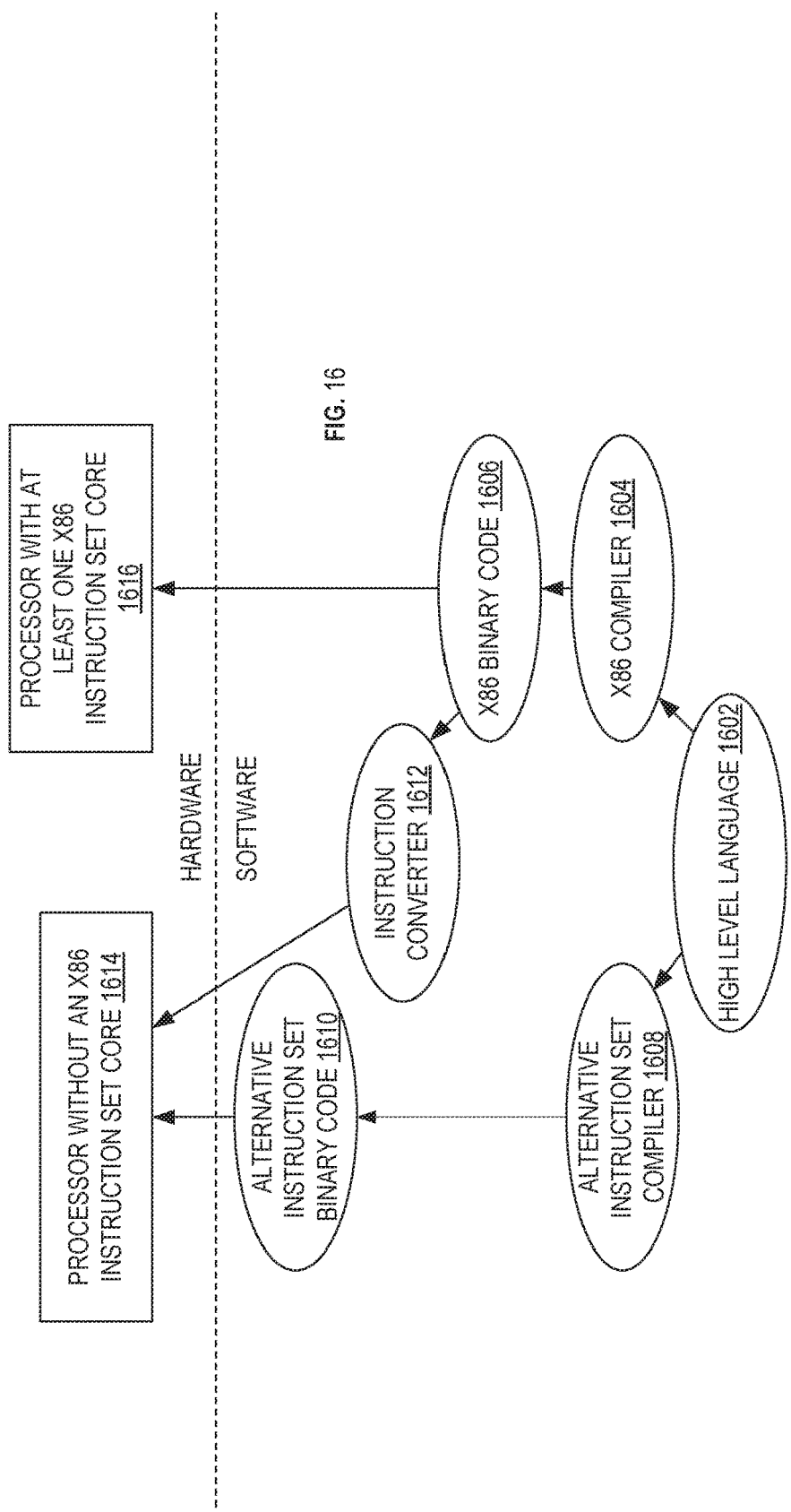

US 10,482,017 B2

PROCESSOR, METHOD, AND SYSTEM FOR CACHE PARTITIONING AND CONTROL FOR ACCURATE PERFORMANCE MONITORING AND OPTIMIZATION

BACKGROUND

Field of the Invention

The various embodiments of the invention described herein relate generally to the field of computer cache management. In particular, the disclosure relates to processor architecture and method to provide cache partitioning and cache performance monitoring.

Description of the Related Art

A processor cache (cache) is a hardware cache used by a processing unit (e.g., a core) to reduce the average cost (e.g., time and/or energy) for accessing data from the main memory. A cache is a smaller, faster memory that is closer to the processing unit and is used for temporarily storing copies of the data from frequently accessed locations in the main memory. Cache performance is critical to the overall performance of the processing unit and thus there is a huge incentive in ensuring that the cache is optimally configured and managed to fit the workload at hand. Cache configuration such as cache prefetch settings and cache replacement algorithms directly affect the data that is available in the cache for use by the processing unit. Cache prefetching is a technique that copies data from the main memory into the cache before the data is needed, based on a predicted memory access pattern. Cache replacement algorithms are used to determine what data should be purge from the cache because they are least likely to be used again.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

Figure 2:
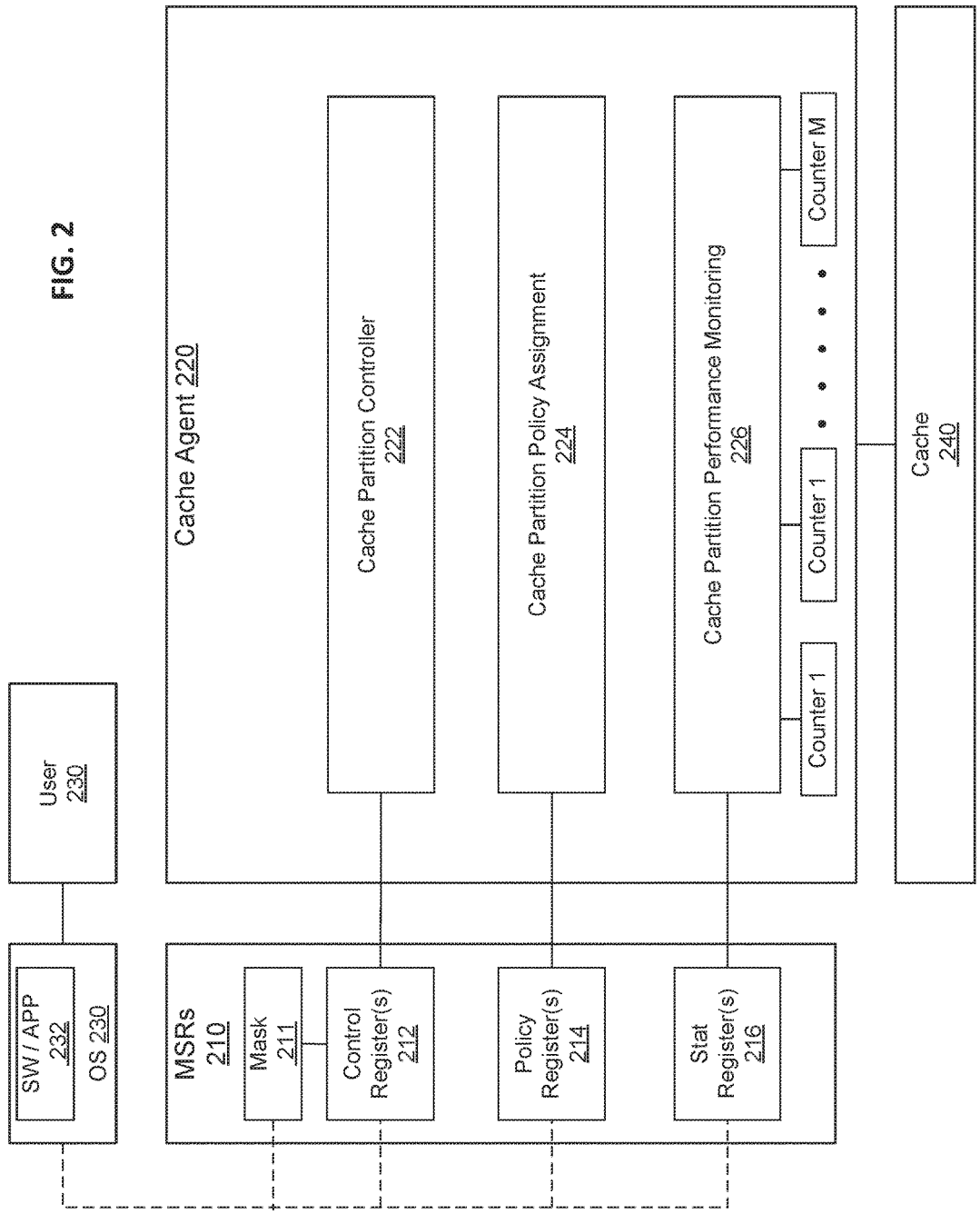
Figure 3:
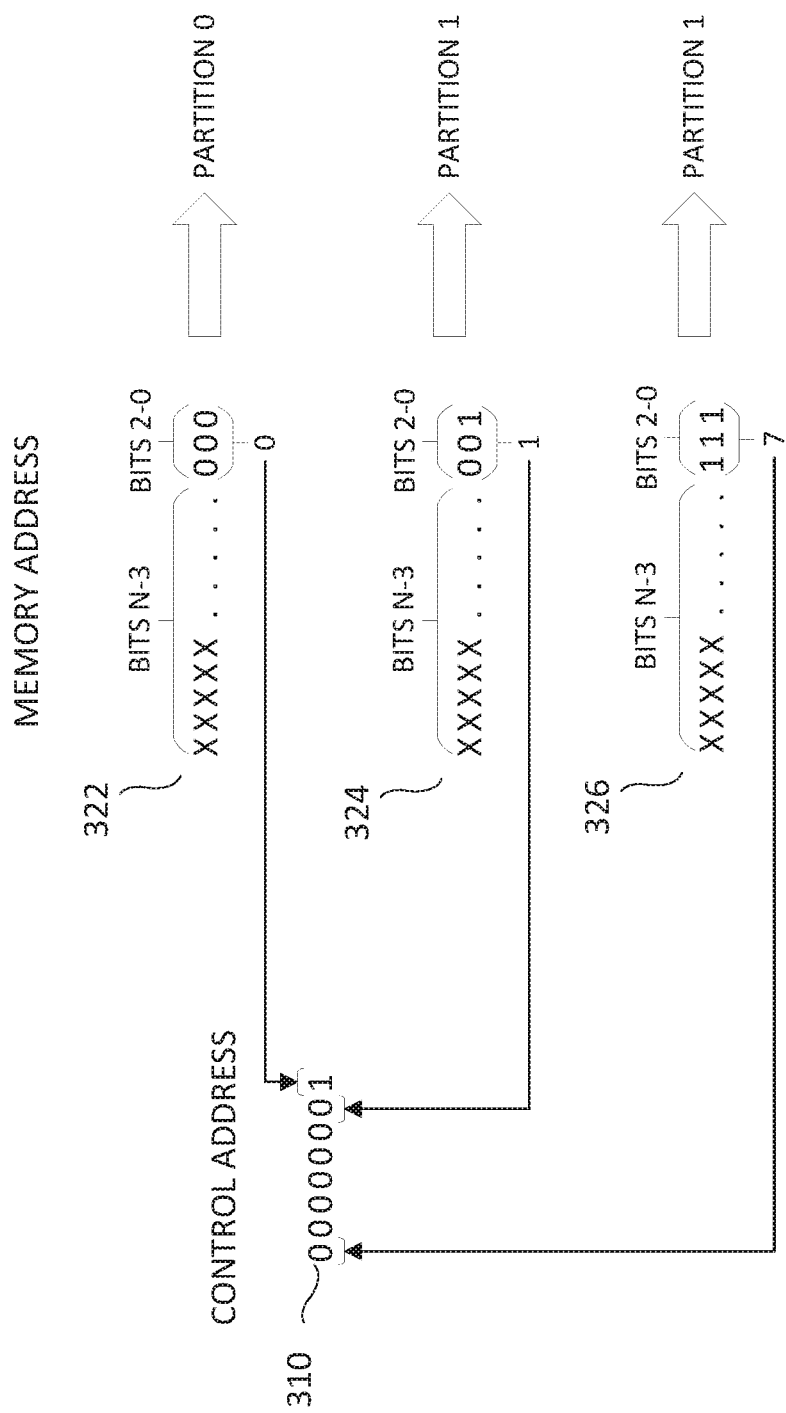
Figure 4:
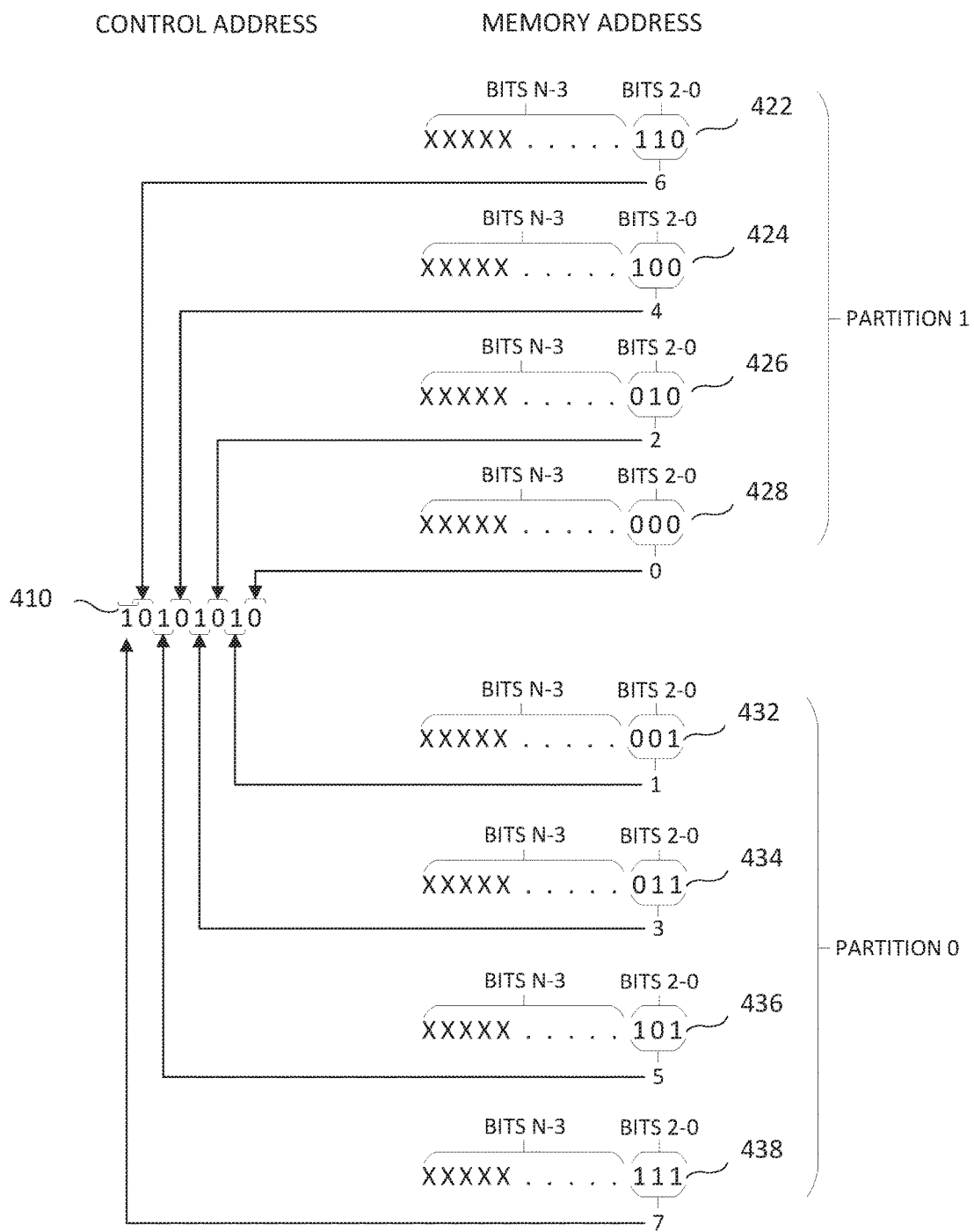
Figure 5:
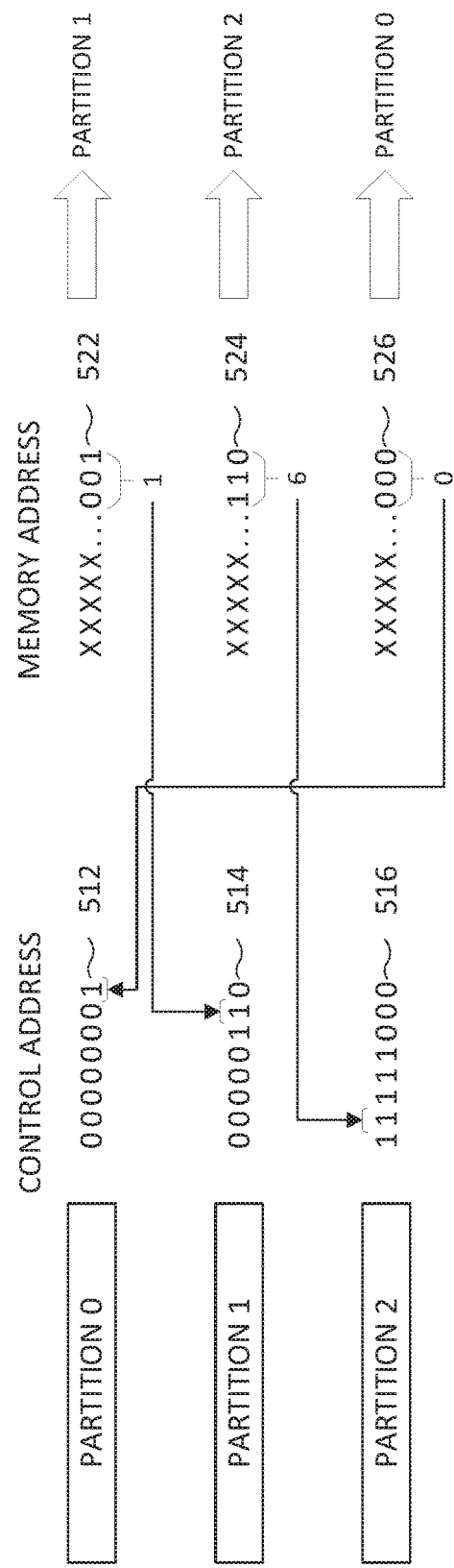
Figure 6:
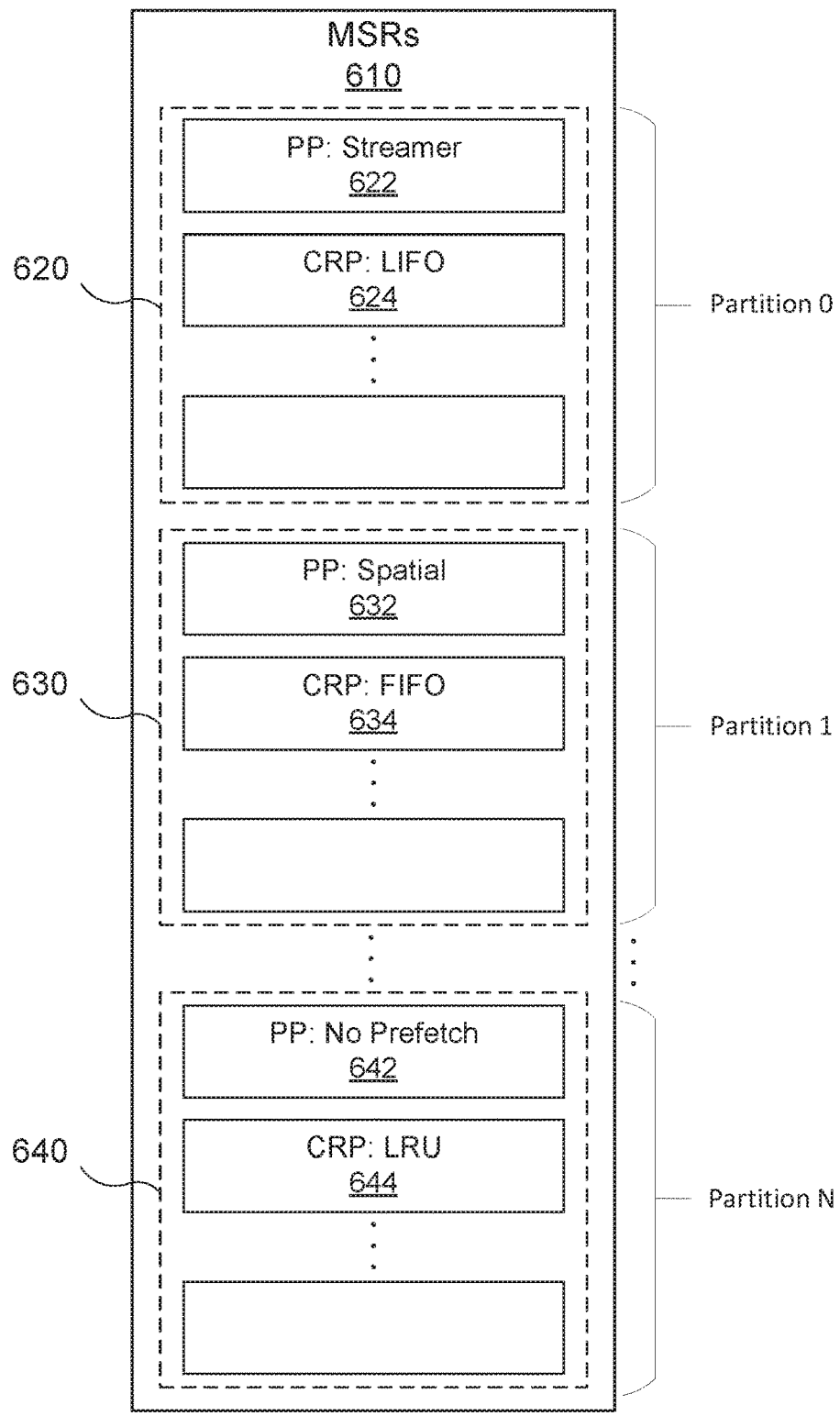
Figure 7:
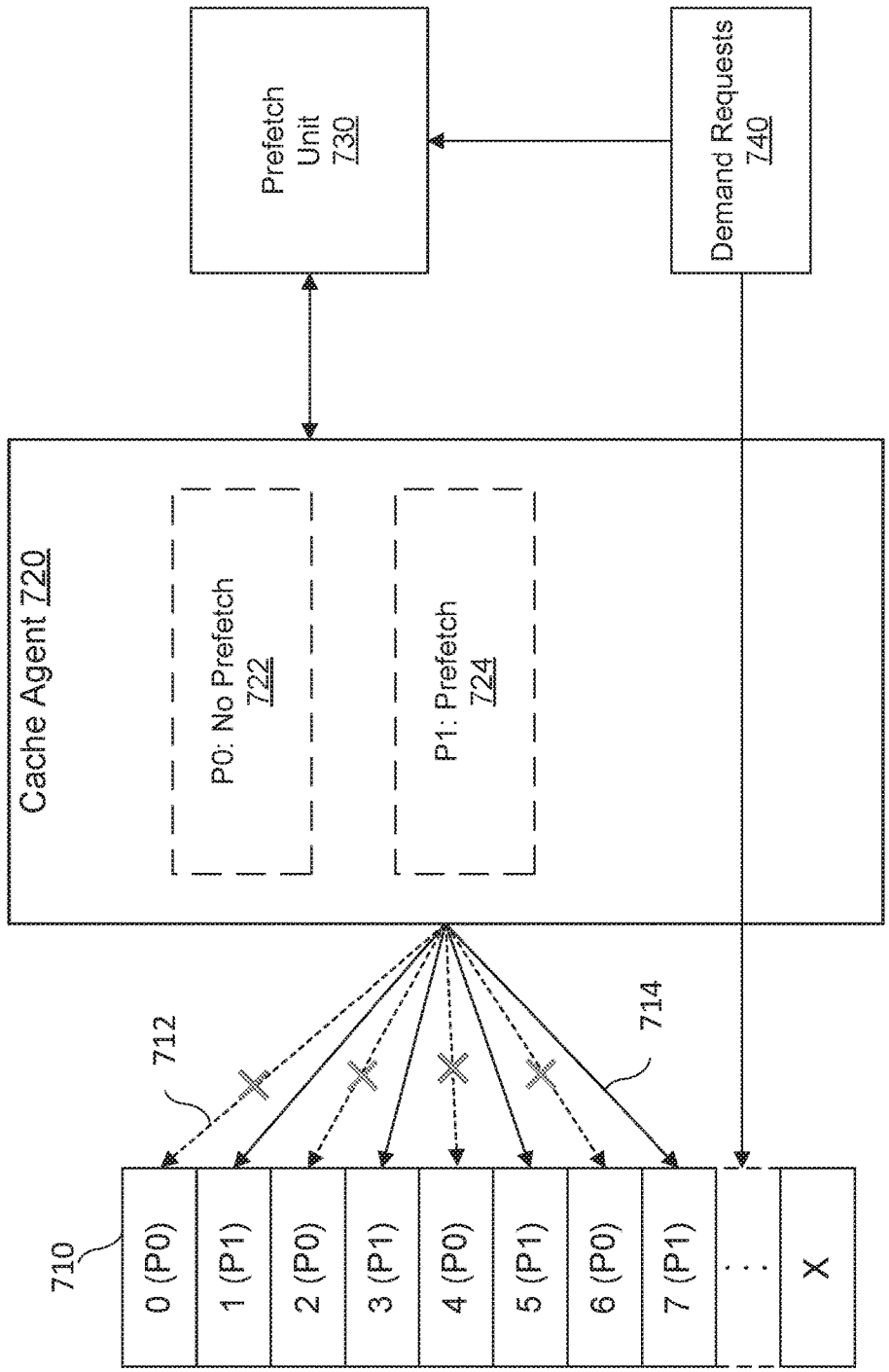
Figure 8:
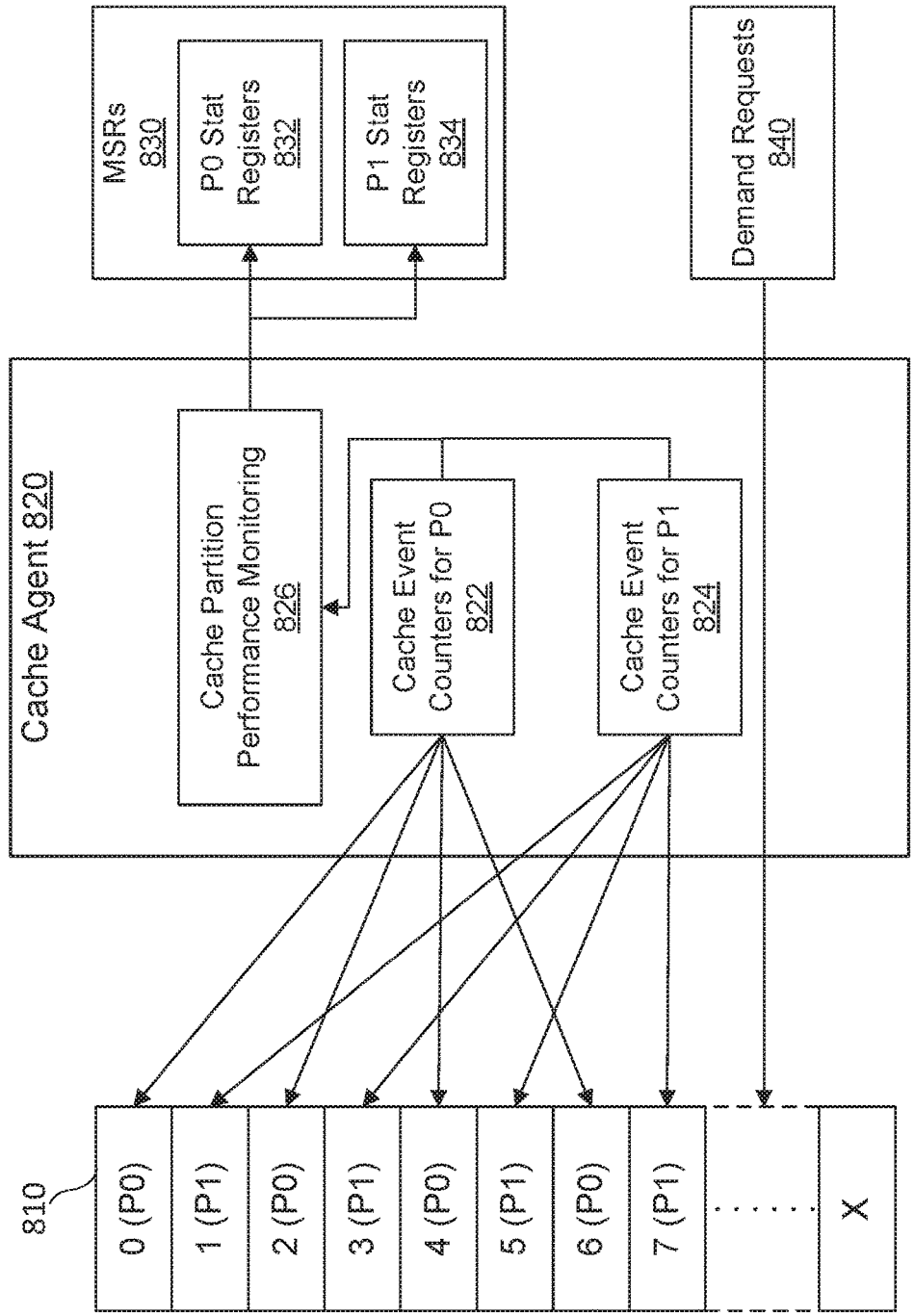
Figure 9:
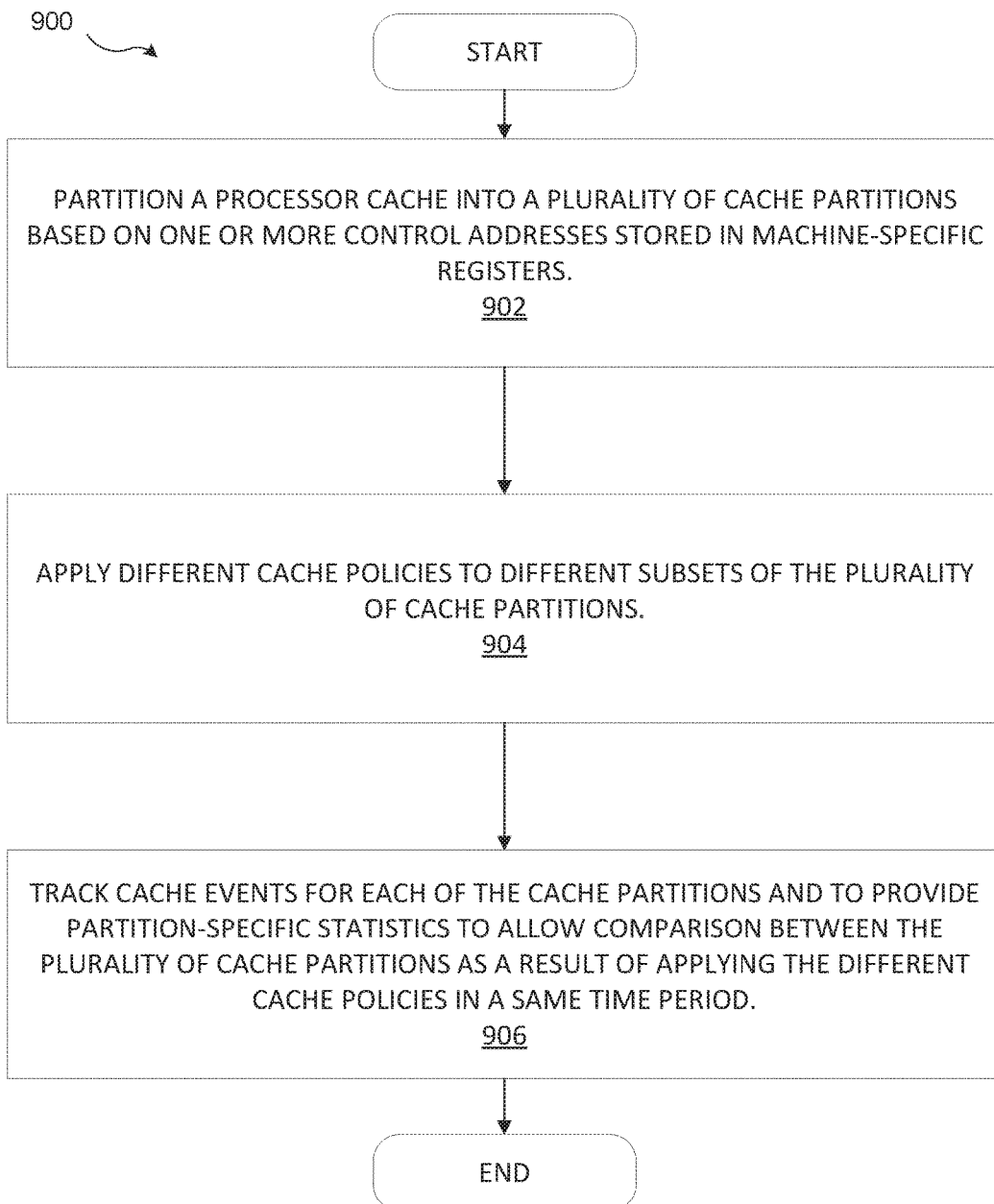
Figures 10A, 10B:
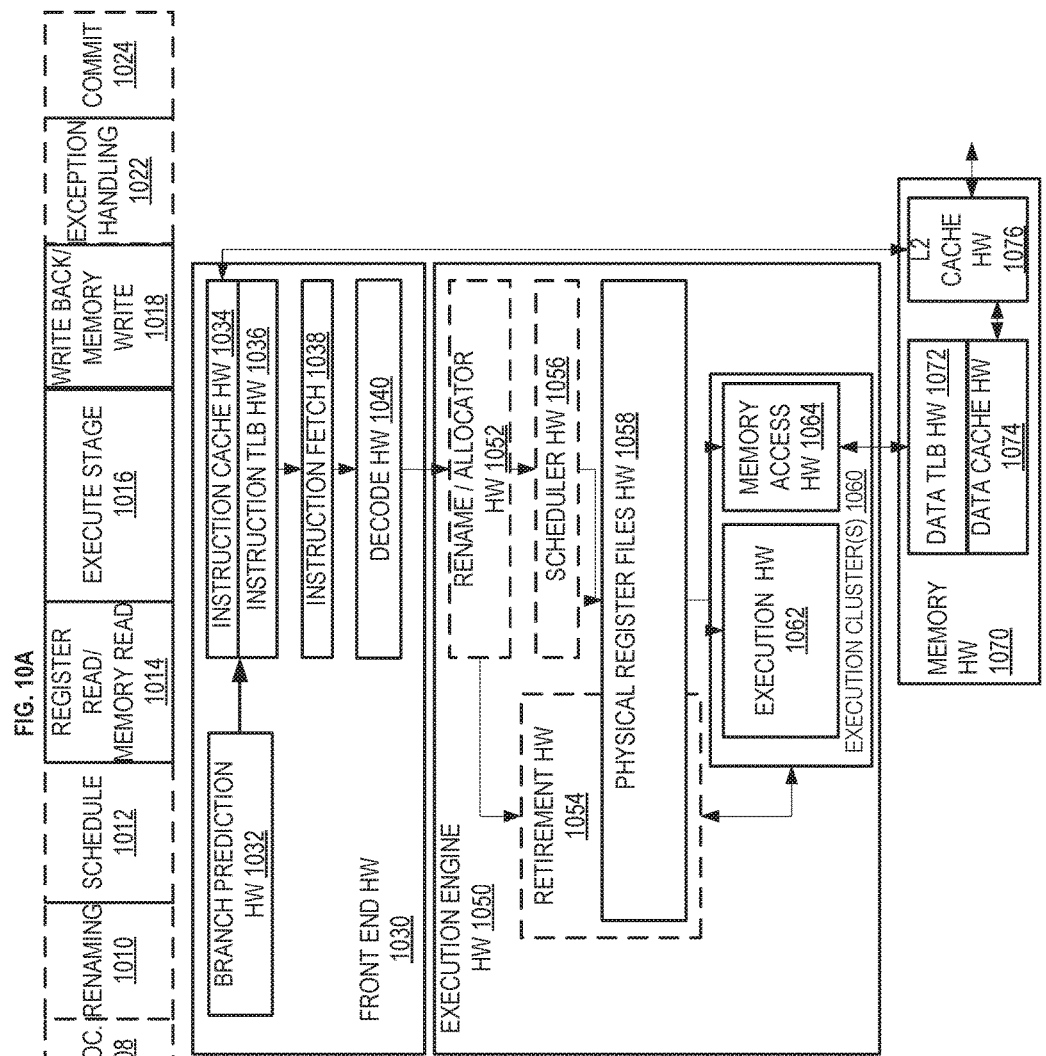
Figure 11:
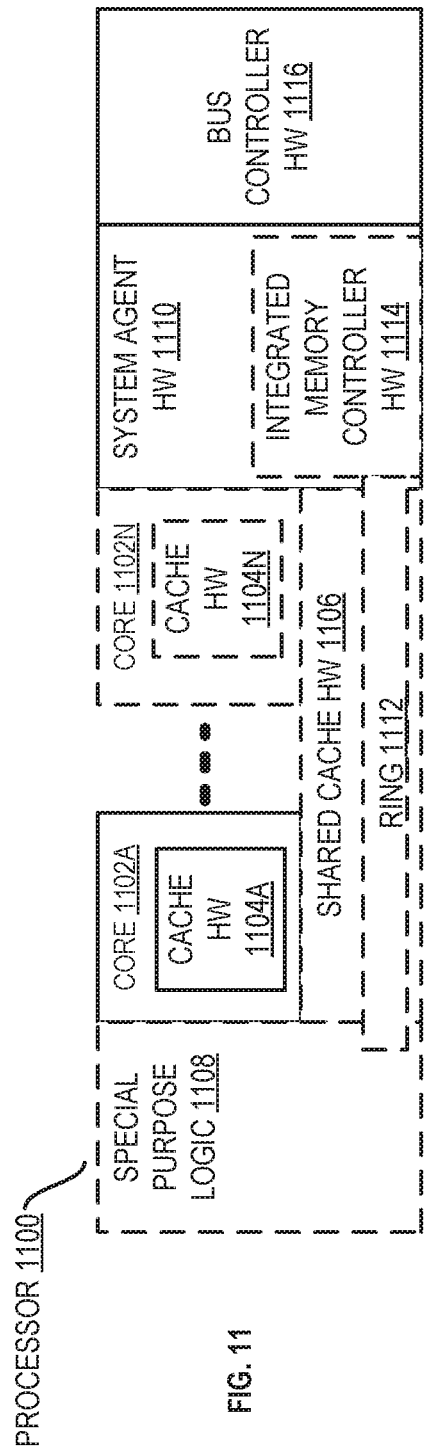
Figure 12:
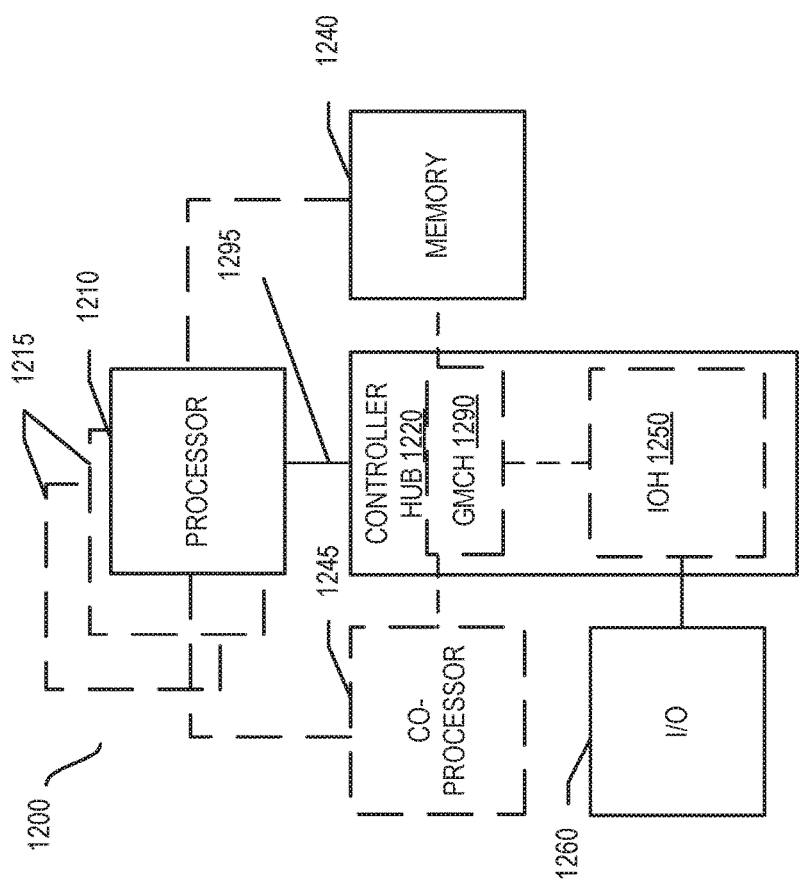
Figure 13:
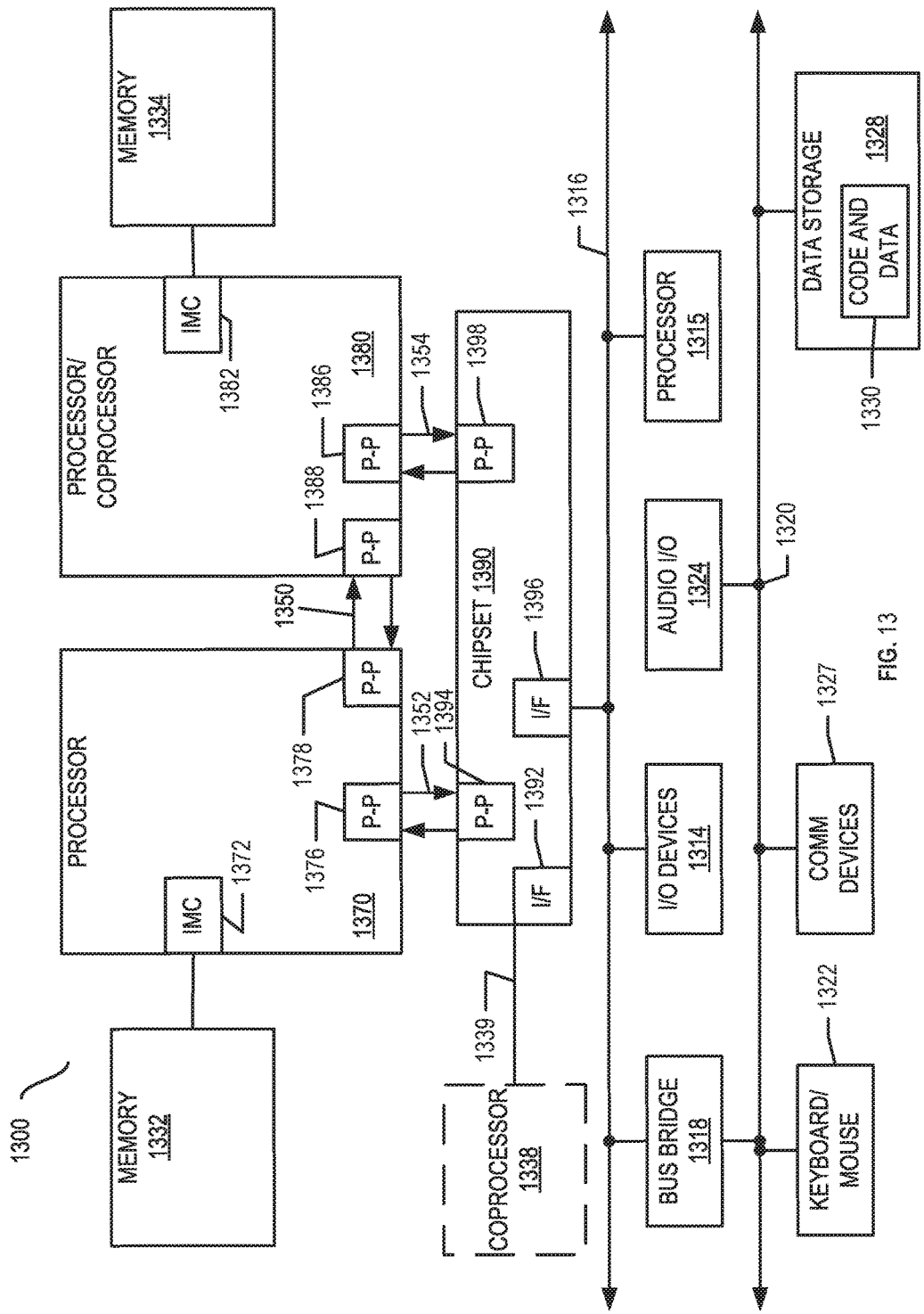
Figure 14:
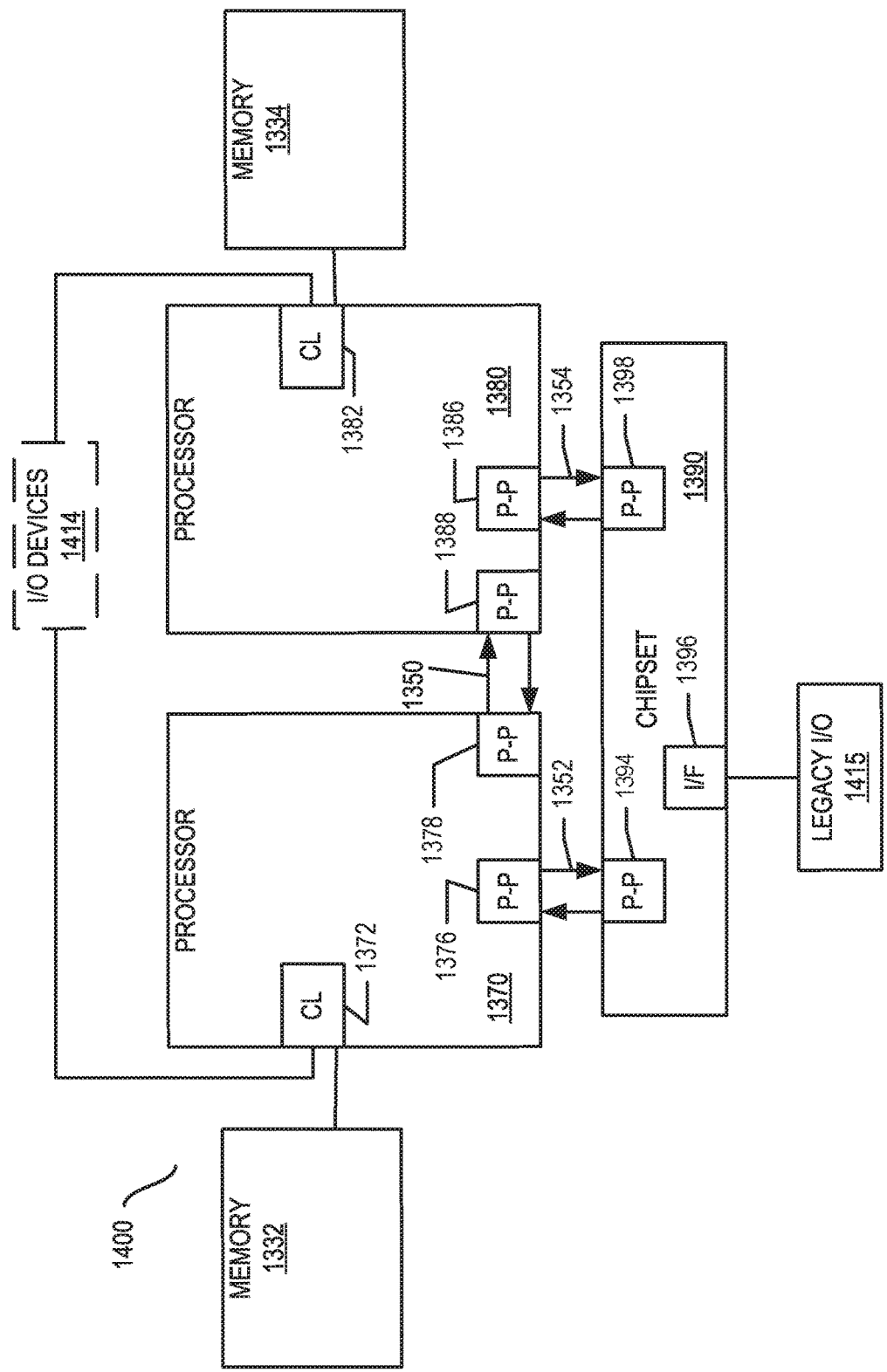
Figure 15:
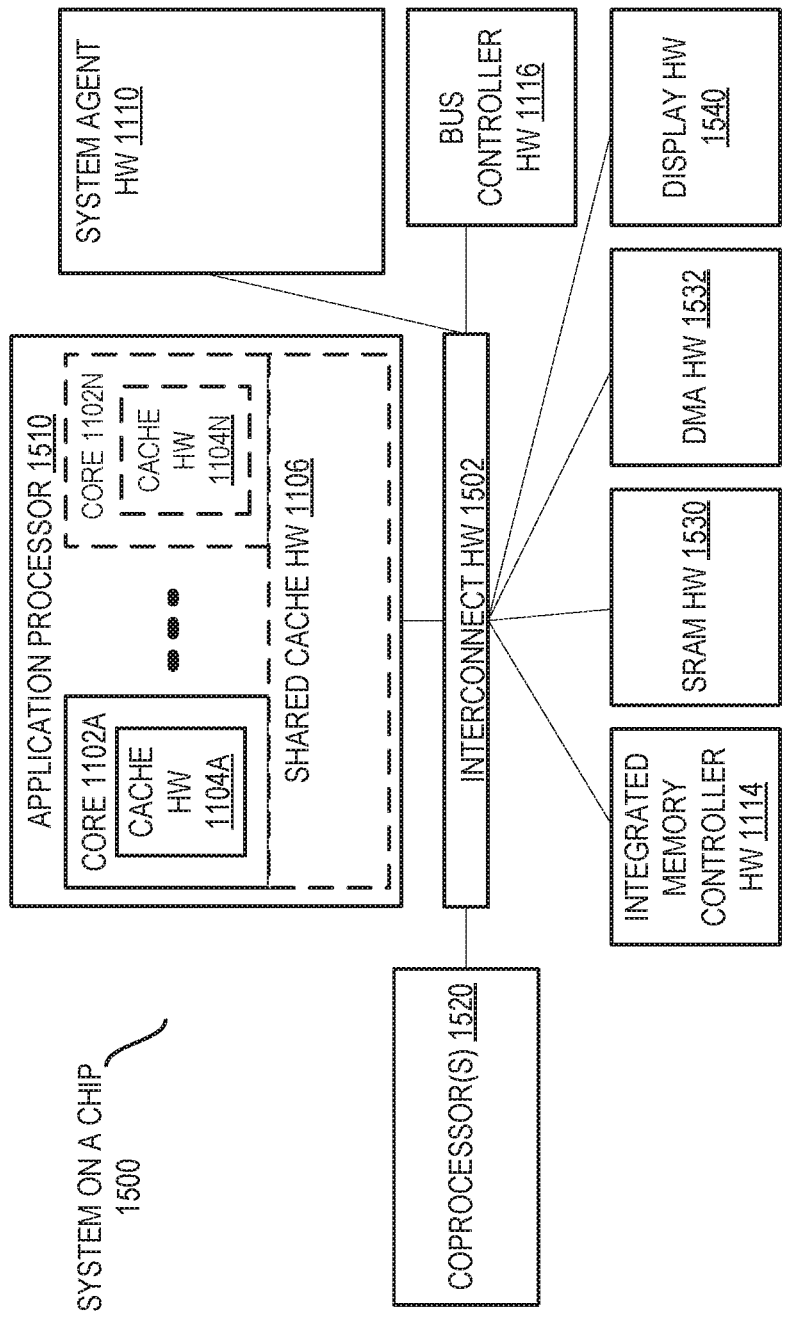

an overview of some of the transactions that may be accomplished by embodiments of the present invention;

FIG. 2 is a block diagram illustrating an embodiment of a system for performing cache partitioning and partition-specific performance monitoring;

FIG. 3 illustrates an example of cache partitioning based on one control address in accordance to an embodiment;

FIG. 4 illustrates another example of cache partitioning based on one control address in accordance an embodiment;

FIG. 5 illustrate an example of cache partitioning in accordance to an embodiment that uses multiple control addresses;

FIG. 6 illustrates an embodiment of the machine-specific registers (MSRs) for storing and/or specifying cache management policies;

FIG. 7 is a block diagram illustrating the application of prefetch policies to different partitions according to an embodiment;

FIG. 8 is a block diagram illustrating the collection of partition-specific statistic according to an embodiments;

FIG. 9 is a flow diagram illustrating an embodiment of a method for providing cache partitioning and partition-specific performance monitoring of the present invention;

FIG. 10A is a block diagram illustrating both an exemplary in-order pipeline and an exemplary register renaming, out-of-order issue/execution pipeline according to embodiments of the invention;

FIG. 10B is a block diagram illustrating both an exemplary embodiment of an in-order architecture core and an exemplary register renaming, out-of-order issue/execution architecture core to be included in a processor according to embodiments of the invention;

FIG. 11 is a block diagram of a single core processor and a multicore processor with integrated memory controller and graphics according to embodiments of the invention;

FIG. 12 illustrates a block diagram of a system in accordance with one embodiment of the present invention;

FIG. 13 illustrates a block diagram of a second system in accordance with an embodiment of the present invention;

FIG. 14 illustrates a block diagram of a third system in accordance with an embodiment of the present invention;

FIG. 15 illustrates a block diagram of a system on a chip (SoC) in accordance with an embodiment of the present invention; and FIG. 16 illustrates a block diagram contrasting the use of a software instruction converter to convert binary instructions in a source instruction set to binary instructions in a target instruction set according to embodiments of the invention.

DETAILED DESCRIPTION

Embodiments of processor, method, and system for cache partitioning and control for accurate partition-specific performance monitoring across cache partitions that apply different cache management policies are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Some of today's processor systems provide users and software applications with the ability to configure and customize cache management features, such as cache prefetching and replacement algorithms, through the use of machine specific registers (MSRs). To achieve better cache performance, users often perform static analysis on their workloads to understand the optimal settings for these cache management features. However, as workloads tend to change over time due to factors such as varying competitions from other co-running threads and/or changes in the phase behavior of the workload itself, settings that were optimal at one time may no longer be so at a later time. Existing systems offer little support to the users and software applications with respect to discovering and responding to these changes in the workload.

Solutions proposed to address this problem include hardware adaptive mechanisms such as demand-throttle for controlling prefetchers and set-sampling/set-dueling for determining replacement algorithms. The information that these hardware mechanisms collect are provided to simple hardware state machines that are responsible for making configuration choices. These simple state machines, however, tend to be extremely limited. They often fail to make optimal configuration choices and, in some cases, may even negatively impact performance. For example, while demand-throttling improves average performance by ~0.5%, it may introduce significant negative outliers that can reduce performance by upwards of 30%. Moreover, existing hardware adaptive mechanisms are designed to apply to the whole cache. In order to observe the workload behavior under different cache management configurations, software must apply different configurations at different time intervals and then compare the performance data collected over these intervals. However, due to runtime changes in workload behavior, such as phase changes discussed above, it is hard to make direct comparisons between the different performance data collected over different time intervals. Techniques such as set-dueling and set-sampling are inflexible and are not visible to the software which means software developers cannot take advantage of these techniques. A better approach is therefore needed to make data collected by hardware adaptive mechanisms visible to the software and thereby enabling the software to dynamically respond to changes in workload behavior and adjust performance features to fit its immediate needs.

Aspects of the present invention allow users and software applications to directly control and measure the performance of various cache management configurations. This in turn helps software developers to use hardware more effectively and thereby improving performance. By giving software increased visibility and control of cache management configurations, lab tests have shown a 30% improvement in performance of outliers when applied to prefetching. When applied to cache replacement algorithms, up to a 10% improvement have been measured on some multi-threaded networking workloads.

Figure 1:
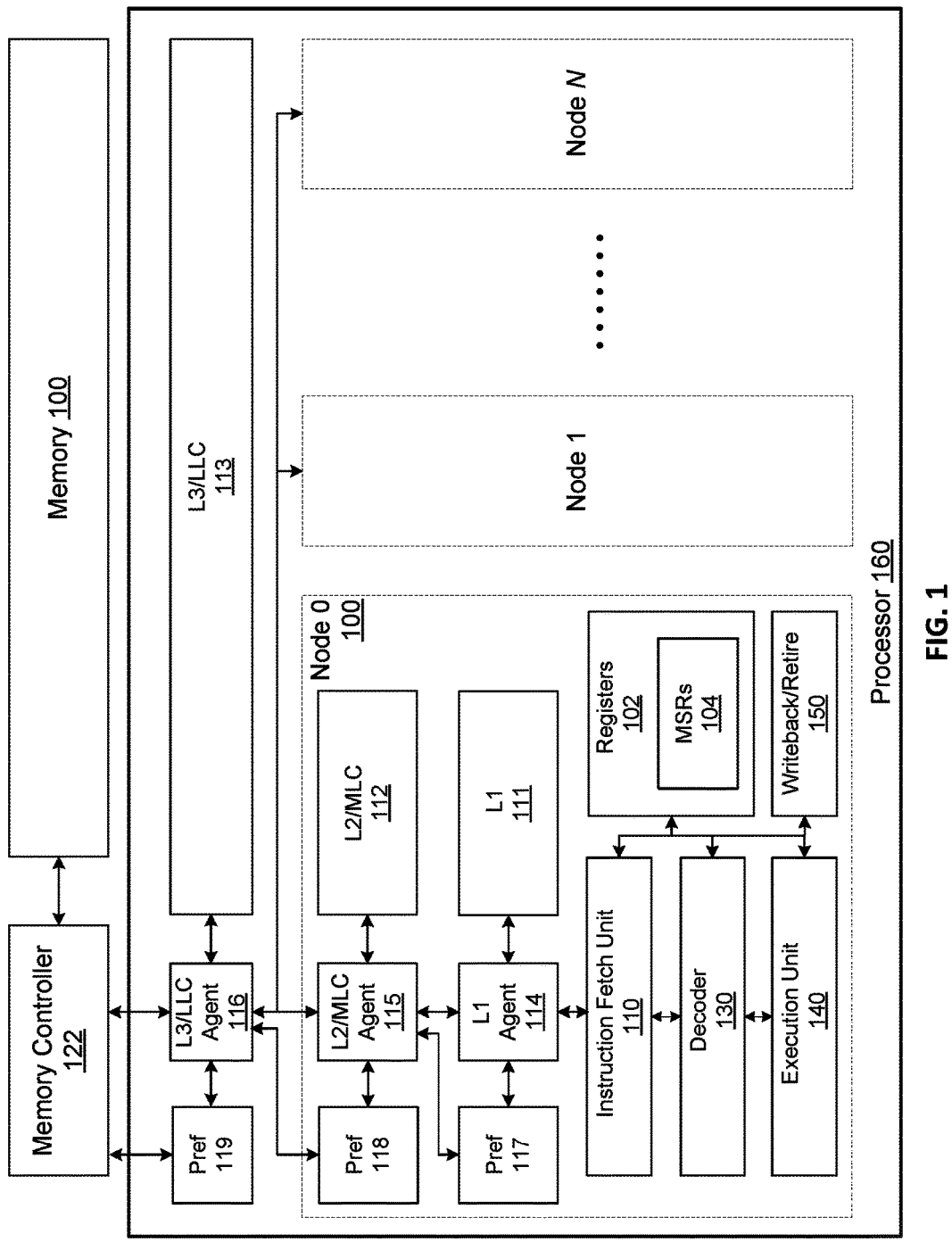
FIG. 1 is a block diagram illustrating an exemplary processor system in which embodiments of the present invention may be implemented.

FIG. 1 illustrates an embodiment of a system of the present invention in detail. According to the embodiment, one or more nodes may reside in a chip multi-processor (CMP), such as processor 160. In some embodiments, each node constitutes, or includes, a processor core (core), logical processor, or hardware thread. The details of a single node (i.e., node 0) are illustrated in FIGS. 1 for simplicity. It will be understood, however, that each node may have the same set of logic, components, circuitry, and/or configuration as node 0. For example, each node may include a set of registers 102, a level 1 cache (L1) 111, and a L2 (L2) or mid-level cache (MLC) 112. The set of registers 102 may further include a set of machine specific register (MSRs) 104. According to an embodiment, the MSRs 104 may be accessible and/or programmable by users at boot time, such as through the Basic Input-Output System (BIOS), or at runtime, such as through the operating system (OS) and/or an application running on the OS. In some embodiments, as shown in FIG. 1, processor 160 further includes a level 3 (L3) cache or LLC 113 that is communicatively coupled to, and shared by, all the nodes. In other embodiments (not shown), the L3/LLC 113 is physically distributed and logically shared among the nodes. Each of L1, L2/MLC, and L3/LLC caches, according to an embodiment, is managed by a respective cache agent or controller (114-116). These caches are usable for caching instructions and data according to a specified set of cache management policies. The set of cache management policies may include configurations and algorithms relating to cache eviction, replacement, prefetch, allocation, etc. One or more cache agents or controllers may be used to perform the functions of a home agent, which may utilize directories to ensure or enforce cache coherence. The cache agents or controllers may connect to prefetchers 117-119. The instructions and data stored within the various processor caches are managed at the granularity of cache lines which may be a fixed size (e.g., 64, 128, 512 Bytes in length). Each node of the exemplary embodiments further includes an instruction fetch unit 110 for fetching instructions from main memory 100 via memory controller 1 22 and/or from the shared LLC 113 via L3/LLC agent 116; a decode unit 130 for decoding the instructions (e.g., decoding program instructions into micro-operations or "uops"); an execution unit 140 for executing the decoded instructions; and a writeback unit 150 for retiring the instructions and writing back the results. The instruction fetch unit 110 may also perform prefetching of instructions from main memory. Alternatively or in addition to, the prefetching of instruction and/or data is performed by a separate prefetcher unit (e.g., 117-118).

FIG. 2 illustrates an embodiment of the cache agent in more detail. The cache agent may be any of L1, L2, or L3 cache agents, such as cache agents 114, 115, 116 of FIG. 1. According to the embodiment, cache agent 220 is communicatively coupled to the cache 240 and a set of machine specific registers (MSRs) 210. The cache agent 220 further includes cache partition controller logic/circuitry 222, cache partition policy assignment logic/circuitry 224, and cache partition performance monitoring logic/circuitry 226. While these logic/circuitries are shown as part of the cache agent 220, they may be implemented as separate components within the processor, such as processor 160 of FIG. 1. The MSRs 210 include mask registers 211 for storing bit masks, control registers 212 for storing control addresses, policy registers 214 for storing cache policies, and stat registers 216 for storing metrics regarding partition-specific cache events. These registers may be accessed (i.e., read and/or modified) by a user 230 through the operating system (OS) 230 or by software applications 232 running on the OS. These registers may also be accessed (i.e., read and/or modify) by the cache partition controller logic/circuitry 222, the cache partition policy assignment logic/circuitry 224, and the cache partition performance monitoring logic/circuitry 226 of cache agent 220. The cache partition performance monitoring logic/circuitry 226 may additionally include, or is coupled to, one or more performance counters (e.g., counters 1-M). Each of the performance counters is associated with a cache partition and is used to track cache events such as cache hits, misses, and/or evictions in the associated cache partition.

The cache partition controller logic/circuitry 222 controls the cache 240 by dividing or partitioning the cache into multiple logical cache partitions based on one or more control addresses stored in the control registers 212. The control registers may be any size greater or equal to the control address. In one embodiment, an 8-bit control register is used for storing an 8-bit control address. To determine the partition to which a memory address is assigned, according to an embodiment, the 3 least significant bits of the memory address is extracted. This may be done through applying a mask, such as one stored in mask register 211 of FIG. 2. In one embodiment, these three bits are used to index into the control register to determine a bit position. According to the embodiment, if the bit at the determined bit position inside the control register is set, then the memory address is assigned to one partition. If that bit is not set, then the memory address is assigned to another partition. For example, as illustrated by FIG. 3, assume that the 8-bit control address 310 is 00000001 such that the bit at bit position zero is set and the bits at bit positions one through seven are not set. If the last three bits of a memory address (e.g., memory address 322) is 000, then the value 0 is used as an index into the control address and bit position zero is examined. Since the bit at bit position zero of the control address is set (i.e., set to 1), the memory address is assigned to partition 0. On the other hand, any memory address that does not have 000 as its last three bits is assigned to partition 1. For instance, memory addresses 324 and 326 end in 001 and 111, respectively. Accordingly, bit positions 1 and 7 of the control address are examined and since neither one is set to 1, memory addresses 324 and 326 are assigned to partition 1. Under this assignment scheme, ⅛ of the memory address space is assigned to partition 0 and ⅞ is assigned to partition 1.

By way of another example, as illustrated in FIG. 4, if the control address 410 is 10101010, then any memory address that has the lowest bits set to 001, 011, 101, or 111 (e.g., memory addresses 432, 434, 436, and 438) will be assigned to partition 0 because the bits at bit positions 1, 3, 5, and 7 of the control address are set to 1. Conversely, any memory address that has the lowest bits set to 000, 010, 100, or 110 (e.g., memory addresses 422, 424, 426, and 428) will be assigned to partition 1 because the bits at bit positions 0, 2, 4, and 6 of the control address are not set (i.e. 0). Based on this assignment, partitions 0 and 1 will each be assigned half of the memory address space. While the three least significant bits of the memory address are used here for determining the index into the control address, any number of bits from any bit positions in the memory address may be used for determining the index. Moreover, memory address that correspond to bit positions that are set in the control address may be assigned to partition 1 instead of partition 0. Conversely, memory addresses that correspond to bit positions that are not set may be assigned to partition 0 instead of partition 1.

In another embodiment, multiple control registers are used, each storing a different control address. The control addresses are all of the same size and each bit position is set only once across all the control addresses. Each control address corresponds to a different partition and a memory address "matching" a particular control address is assigned to the partition corresponding to the matched control address. Thus, a memory address matching the control address stored in control register 0 may be assigned to partition 0, a memory address matching the control address stored in control register 1 may be assigned to partition 1, and so on and so forth. According to an embodiment, there may be a catch all partition to which any memory address that does not match any of the control addresses is assigned. Similar to what was described above, a portion of each memory address is used to determine an index into each of the control addresses. If the bit position corresponding to the index is set, then the memory address is deemed a "match" and is assigned to the partition associated with the matching control address. For example, as illustrated by FIG. 5, three control addresses are used. According to an embodiment, each of the control addresses is stored in one of the MSRs. Each of the three control addresses, 512, 514, 516, corresponds one of the partitions (i.e., partitions 0, 1, and 2, respectively). In FIG. 5, the least significant three bits of memory address 522 is "001". As such, the value 1 is used to index into the control addresses. Since the only control address that has the bit at bit position 1 set to 1 is control address 514, thus, memory address 522 is assigned to the partition that corresponds to control address 514 (i.e., partition 1). In the case of memory address 524, which ends in "110," the value 6 is used to index into the control addresses. Accordingly, since control address 516 has the bit at bit position 6 set to 1, memory address 524 is assigned to partition 2 that corresponds to control address 516. As for memory address 526, its least significant three bits are zeros, as such, value 0 is used as the index. Since control address 512 is the only one that has a bit set at bit position 0, memory address 526 is assigned to the partition 0.

According to another embodiment, a different assignment scheme is used all together where a portion of the memory address is used to compare directly with the control address rather than be used to index into the control address. In one embodiment, the set bits in the control address are used for comparing with bits in the memory address at the same bit positions. For example, assuming that the 8-bit control address is set to 00000001, the set bit at bit position zero will be used to compare with the same bit position in the memory address. This means all memory addresses with the lowest bit set to 1 will be assigned to partition 0 while all other addresses will be assigned to partition 1. This creates two partitions of equal size. By way of another example, if the 8-bit control address is set to 00000011, then the bits at bit positions 0 and 1 that are set to 1 will be used to compare with the two corresponding bit positions in the memory address. This means that any memory address with its lowest 2 bits set to 1 will be assigned to partition 0 while all other memory addresses will be assigned to partition 1. This assignment scheme results in partition 0 having ¼ of the memory addresses and partition 1 having ¾ of the memory addresses.

The aforementioned partition-assigning schemes are meant to illustrate the various possible ways of partitioning the total memory address space through the use one or more control addresses and are in no ways limiting. The control addresses and associated masks stored in the control registers described herein may be of any size and/or combination.

Through user-modifiable control addresses stored in control registers, users and software are provided with a great deal of flexibility in creating and customizing partitions of different sizes and address mappings. Once these partitions are defined, each partition is provided with a set of MSRs and performance counters for fine grain customization and tracking of cache events such as cache hits, misses, evictions, etc. that occur in each respective partition.

According to an embodiment, a partition assignment module is responsible for assigning cache policies to different cache partitions. Once the partitions have been created by the partition control module, a separate set of policies is maintained for each partition in the MSRs. The users and software may write to the MSRs to set, modify, or delete the policies to be applied to each of the partitions. In one embodiment, each partition is associated with a respective set of MSRs for specifying the various policies to be applied for that partition. These MSRs allow policies to be applied on a partitions-to-partition basis. FIG. 6 illustrate an embodiment of the MSRs for storing and/or specifying cache management policies. MSRs 610 includes N set of MSRs (620, 630, and 640). Each set of MSRs corresponds to a different partition (partitions 0-N). Within each set of MSRs, different registers are used to specify the policies to be applied to the corresponding partition. For example, MSR set 620 includes register 622 that specifies that the prefetch policy (PP) to be applied to partition 0 is streamer and register 624 that specifies the cache replacement policy (CRP) to be applied is the last in first out (LIFO) policy. For partition 1, the corresponding MSR 630 includes registers 632 and 634 specifying, respectively, that spatial prefetch policy and first in first out (FIFO) cache replacement policy are to be applied to partition 1. MSR set 640 includes register 642 specifying that no prefetch is to be applied to partition N and that the cache replacement policy is least recently used (LRU).

FIG. 7 illustrates the application of prefetch policies to different partitions according to an embodiment. The cache agent 720 receives demand requests 740 from instruction/data fetch units (not shown) and prefetch requests from prefetch unit 730. All demand requests 740 are processed by the cache agent 720 as normal and data is fetched from the cache 710. With respect to prefetch requests from the prefetch unit 730, according to an embodiment, they are received and filtered by the cache agent 720 based on the partition that the prefetch request is directed to and the prefetch policy associated with that partition. For each prefetch request, the cache agent 720 first determines the cache partition that the prefetch request is directed to based on one or more control addresses stored in the MSRs. Once the partition is determined, the cache agent 720 responsibly determines the prefetch policy associated with the partition from the MSRs. The prefetch policy may indicate whether prefetching is enabled or disabled for the associated partition. If prefetching is enabled, the policy may specify the type of prefetching algorithm to be used. For partitions that have prefetch enabled, the prefetch requests to those partitions will be processed and responded to as normal. For partitions that have prefetching disabled, prefetch requests to those partitions are dropped by the cache agents. As shown in FIG. 7, prefetching is disabled for partition 0 according to prefetch policy 722 and enabled for partition 1 according to prefetch policy 724. Therefore, the cache agent 720 filters out prefetch requests to partition 0 (e.g., 712) while processes those to partition 1 (e.g., 714). In another embodiment, instead of the cache agent 720 performing the filtering of prefetch requests, the prefetch unit 730 may access the MSRs directly for the control address and the prefetch policies to perform prefetch filtering. Alternatively, or in addition to, the prefetch unit 730 may receive from cache agent 720 the prefetch policy associated with each of the partitions.

Partition-specific MSRs not only allow the assignment of different cache management policies to different partitions, but also allow for the collection of partition-specific statistics. FIG. 8 illustrates the collection of partition-specific statistic according to an embodiment. The cache agent 820 processes demand requests 840 in accordance to various cache management policies described above. The cache agent 820 additionally includes partition-specific counters, such as cache event counters for P0 822 and for P1 824, for monitoring and tracking various cache events for each partition. These cache events may include hits/misses, hits to modified cache lines in other cores (HITMS), writebacks, etc. Different types of cache events may be tracked by different counters. The cache partition performance monitoring logic/circuitry 826 collects the tracked events from counters 822 and 824. In one embodiment, the cache partition performance monitoring logic circuitry 826 writes or stores the collected statistics to statistic registers, 832 and 834, in the MSR 830 for each partition. The users and/or software applications may then access partition-specific statistics from these registers. Partition-specific statistics allow software to simultaneously compare the performance of two or more different policies in their respective partitions over the same time period. This capability may be applied to a broad range of cache configurations and optimizations. Software can take advantage of the performance comparisons to dynamically choose the optimal configurations for prefetching, replacement policy, etc. In one embodiment, the software may dynamically alter the behavior of cache allocation technology (CAT) between different partition sizes. CAT generally reduces outliers at the cost of lowering performance. Using this capability, software can dynamically switch back and forth between partitioned and shared cache modes which in turn allows software developers to harvest improved average performance while still avoid worst case behaviors (i.e., outliers).

FIG. 9 illustrate an embodiment of a method of the present invention. The method 900 may be implemented in any of the processor system described above and performed by the cache agents or controllers within the processor system. At block 902, a processor cache is partitioned into a plurality (i.e. two or more) cache partitions based on one or more control addresses stored in machine-specific registers of the processor system. At block 904, different cache management policies are applied to different subsets of the different cache partitions. There may be any number of subsets each of which may include one or more cache partitions. For example, a first cache management policy may be applied to a first subset that includes 3 cache partitions (e.g., cache partitions 1-3) while a second cache management policy may be applied to a second subset that includes only one partition (e.g., cache partition 4). According to an embodiment, this is accomplished by setting multiple MSRs (e.g., MSRs corresponding to cache partitions 1-3) with the same cache management policy. At block 906, cache events are tracked and collected for each of the different cache partitions. The collected partition-specific statistics allow software or users to compare the performance of different partitions over the same time period to better identify the effects that different cache management policies have on different cache partitions.

An exemplary embodiment of the present invention is a processor that includes: a cache; a cache controller circuitry to partition the cache into a plurality of cache partitions based on one or more control addresses; a cache policy assignment circuitry to apply different cache policies to different subsets of the plurality of cache partitions; and a cache performance monitoring circuitry to track cache events separately for each of the cache partitions and to provide partition-specific statistics to allow comparison between the plurality of cache partitions, as a result of applying the different cache policies in a same time period. The processor may include multiple machine specific registers (MSRs) to store the one or more control addresses, the cache policies, and the partition-specific statistics. The cache controller circuitry may receive a request to access a memory address and may responsively determine one of the plurality of cache partitions to which the memory address is assigned, such that the memory address is to be assigned to a first cache partition if a portion of the memory address matches a first one of the one or more control addresses, or it is to be assigned to a second cache partition if the portion of the memory address matches a second one of the one or more control addresses. In some embodiments, the memory address may be assigned to a third cache partition if the portion of the memory address does not match any of the one or more control addresses. A mask may be applied to the memory address in order to generate the portion of the memory address that is used for determining a match between the memory address and the one or more control addresses. The portion of the memory address may be used to specify a bit position of the one or more control addresses such that the memory address is a match for a first control address when a bit is set at the specified bit position of the first control address and not a match when the bit is not set. The cache policies may include cache replacement policies and cache line prefetch policies. The cache performance monitoring circuitry may further include one or more counters, each of the counters may be used to track occurrences of a particular cache event for a specific cache partition.

Another embodiment of the present invention is a method that includes: partitioning, by a cache controller circuitry, a processor cache into a plurality of cache partitions based on one or more control addresses; applying, by a cache policy assignment circuitry, different cache policies to each of the plurality of cache partitions; and tracking, by a cache performance monitoring circuitry, cache events for each of the cache partitions and to provide partition-specific statistics to allow comparison between the plurality of cache partitions as a result of applying the different cache policies in a same time period. The one or more control addresses, the cache policies, and the partition-specific statistics may be stored in a plurality of machine specific registers (MSRs). Partitioning the cache into a plurality of cache partitions may further include receiving a request to access a memory address and responsively determining one of the plurality of cache partitions to which the memory address is assigned, such the memory address is to be assigned to a first cache partition if a portion of the memory address matches a first one of the one or more control addresses, or it is to be assigned to a second cache partition if the portion of the memory address matches a second one of the one or more control addresses. In some embodiments, the memory address may be assigned to a third cache partition if the portion of the memory address does not match any of the one or more control addresses. The method may further include applying a mask to the memory address to generate the portion of the memory address used for determining a match between the memory address and the one or more control addresses. The portion of the memory address may used to specify a bit position of the one or more control addresses. The memory address is a match for a first control address if the bit at the specified bit position of the first control address is set, whereas the memory address is not a match if that bit is not set. The cache policies may include cache replacement policies as well as cache line prefetch policies. The cache performance monitoring circuitry may further include a plurality of counters, each of which tracks occurrences of a particular cache event for a specific cache partition.

Yet another embodiment of the present invention is a system that includes a memory and a processor. The processor further includes a cache; a cache controller circuitry to partition the cache into a plurality of cache partitions based on one or more control addresses; a cache policy assignment circuitry to apply different cache policies to different subsets of the plurality of cache partitions; and a cache performance monitoring circuitry to track cache events separately for each of the cache partitions and to provide partition-specific statistics to allow comparison between the plurality of cache partitions, as a result of applying the different cache policies in a same time period. The processor may also include multiple machine specific registers (MSRs) to store the one or more control addresses, the cache policies, and the partition-specific statistics. The cache controller circuitry may receive a request to access a memory address and may responsively determine one of the plurality of cache partitions to which the memory address is assigned, such that the memory address is to be assigned to a first cache partition if a portion of the memory address matches a first one of the one or more control addresses, or it is to be assigned to a second cache partition if the portion of the memory address matches a second one of the one or more control addresses. In some embodiments, the memory address may be assigned to a third cache partition if the portion of the memory address does not match any of the one or more control addresses. A mask may be applied to the memory address in order to generate the portion of the memory address that is used for determining a match between the memory address and the one or more control addresses. The portion of the memory address may be used to specify a bit position of the one or more control addresses such that the memory address is a match for a first control address when a bit is set at the specified bit position of the first control address and not a match when the bit is not set. The cache policies may include cache replacement policies and cache line prefetch policies. The cache performance monitoring circuitry may further include one or more counters, each of the counters may be used to track occurrences of a particular cache event for a specific cache partition.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end hardware 1030 coupled to an execution engine hardware 1050, and both are coupled to a memory hardware 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end hardware 1030 includes a branch prediction hardware 1032 coupled to an instruction cache hardware 1034, which is coupled to an instruction translation lookaside buffer (TLB) 1036, which is coupled to an instruction fetch hardware 1038, which is coupled to a decode hardware 1040. The decode hardware 1040 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode hardware 1040 or otherwise within the front end hardware 1030). The decode hardware 1040 is coupled to a rename/allocator hardware 1052 in the execution engine hardware 1050.

The execution engine hardware 1050 includes the rename/allocator hardware 1052 coupled to a retirement hardware 1054 and a set of one or more scheduler hardware 1056. The scheduler hardware 1056 represents any number of different schedulers, including reservations stations, central instruction window, etc. The scheduler hardware 1056 is coupled to the physical register file(s) hardware 1058. Each of the physical register file(s) hardware 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1058 comprises a vector registers hardware, a write mask registers hardware, and a scalar registers hardware. This register hardware may provide architectural vector registers, vector mask registers, and general purpose registers. The physical register file(s) hardware 1058 is overlapped by the retirement hardware 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1054 and the physical register file(s) hardware 1058 are coupled to the execution cluster(s) 1060. The execution cluster(s) 1060 includes a set of one or more execution hardware 1062 and a set of one or more memory access hardware 1064. The execution hardware 1062 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1056, physical register file(s) hardware 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1064). It should also be understood that where separate pipelines are used, one or more of these pipelines may be out-of-order issue/execution and the rest in-order.

The set of memory access hardware 1064 is coupled to the memory hardware 1070, which includes a data TLB hardware 1072 coupled to a data cache hardware 1074 coupled to a level 2 (L2) cache hardware 1076. In one exemplary embodiment, the memory access hardware 1064 may include a load hardware, a store address hardware, and a store data hardware, each of which is coupled to the data TLB hardware 1072 in the memory hardware 1070. The instruction cache hardware 1034 is further coupled to a level 2 (L2) cache hardware 1076 in the memory hardware 1070. The L2 cache hardware 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode hardware 1040 performs the decode stage 1006; 3) the rename/allocator hardware 1052 performs the allocation stage 1008 and renaming stage 1010; 4) the scheduler hardware 1056 performs the schedule stage 1012; 5) the physical register file(s) hardware 1058 and the memory hardware 1070 perform the register read/memory read stage 1014; the execution cluster 1060 perform the execute stage 1016; 6) the memory hardware 1070 and the physical register file(s) hardware 1058 perform the write back/memory write stage 1018; 7) various hardware may be involved in the exception handling stage 1022; and 8) the retirement hardware 1054 and the physical register file(s) hardware 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1034/1074 and a shared L2 cache hardware 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller hardware 1116, while the optional addition of the dashed lined boxes illustrates an alternative processor 1100 with multiple cores 1102A-N, a set of one or more integrated memory controller hardware 1114 in the system agent hardware 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1106, and external memory (not shown) coupled to the set of integrated memory controller hardware 1114. The set of shared cache hardware 1106 may include one or more mid-level caches, such as level 2 (L2), level 3 (L3), level 4 (L4), or other levels of cache, a last level cache (LLC), and/or combinations thereof. While in one embodiment a ring based interconnect hardware 1112 interconnects the integrated graphics logic 1108, the set of shared cache hardware 1106, and the system agent hardware 1110/integrated memory controller hardware 1114, alternative embodiments may use any number of well-known techniques for interconnecting such hardware. In one embodiment, coherency is maintained between one or more cache hardware 1106 and cores 1102-A-N.

In some embodiments, one or more of the cores 1102A-N are capable of multi-threading. The system agent 1110 includes those components coordinating and operating cores 1102A-N. The system agent hardware 1110 may include for example a power control unit (PCU) and a display hardware. The PCU may be or include logic and components needed for regulating the power state of the cores 1102A-N and the integrated graphics logic 1108. The display hardware is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. In one embodiment, the cores 1102A-N are heterogeneous and include both the "small" cores and "big" cores described below.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) hardware 1372 and 1382, respectively. Processor 1370 also includes as part of its bus controller hardware point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) hardware), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage hardware 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller hardware and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect hardware 1502 is coupled to: an application processor 1510 which includes a set of one or more cores 1102A-N and shared cache hardware 1106; a system agent hardware 1110; a bus controller hardware 1116; an integrated memory controller hardware 1114; a set or one or more coprocessors 1520 which may include integrated graphics logic, an image processor, an audio processor, and a video processor; an static random access memory (SRAM) hardware 1530; a direct memory access (DMA) hardware 1532; and a display hardware 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor comprising:
a cache;
cache controller circuitry to partition the cache into a plurality of cache partitions based on one or more control addresses, the cache controller circuitry further to receive a request to access a memory address and responsively determine one of the plurality of cache partitions to which the memory address is assigned, wherein the memory address is assigned to a first cache partition if a portion of the memory address matches a first one of the one or more control addresses and assigned to a second cache partition if the portion of the memory address matches a second one of the one or more control addresses;
cache policy assignment circuitry to apply different cache policies to different subsets of the plurality of cache partitions; and
cache performance monitoring circuitry to track cache events separately for each of the cache partitions and to provide partition-specific statistics to allow comparison between the plurality of cache partitions as a result of applying the different cache policies in a same time period.

2. The processor of claim 1, further comprising a plurality of machine specific registers (MSRs) to store the one or more control addresses, the cache policies, and the partition-specific statistics.

3. The processor of claim 1, wherein the memory address is assigned to a third cache partition if the portion of the memory address does not match any of the one or more control addresses.

4. The processor of claim 1, wherein a mask is applied to the memory address to generate the portion of the memory address used for determining a match between the memory address and the one or more control addresses.

5. The processor of claim 4, wherein the portion of the memory address is used to specify a bit position of the one or more control addresses and wherein the memory address is a match for a first control address if a bit is set at the specified bit position of the first control address and not a match if the bit is not set.

6. The processor of claim 1, wherein the cache policies comprise cache replacement policies.

7. The processor of claim 1, wherein the cache policies comprise cache line prefetch policies.

8. The processor of claim 1, wherein the cache performance monitoring circuitry comprises a plurality of counters, each tracking occurrences of a particular cache event for a specific cache partition.

9. A method comprising:
partitioning, by cache controller circuitry, a processor cache into a plurality of cache partitions based on one or more control addresses;
receiving, by the cache controller circuitry, a request to access a memory address and responsively determining one of the plurality of cache partitions to which the memory address is assigned, wherein the memory address is assigned to a first cache partition if a portion of the memory address matches a first one of the one or more control addresses and assigned to a second cache partition if the portion of the memory address matches a second one of the one or more control addresses;
applying, by cache policy assignment circuitry, different cache policies to different subsets of the plurality of cache partitions; and
tracking, by cache performance monitoring circuitry, cache events for each of the cache partitions and to provide partition-specific statistics to allow comparison between the plurality of cache partitions as a result of applying the different cache policies in a same time period.

10. The method of claim 9, wherein the one or more control addresses, the cache policies, and the partition-specific statistics are stored in a plurality of machine specific registers (MSRs).

11. The method of claim 9, wherein the memory address is assigned to a third cache partition if the portion of the memory address does not match any of the one or more control addresses.

12. The method of claim 9, further comprising applying a mask to the memory address to generate the portion of the memory address used for determining a match between the memory address and the one or more control addresses.

13. The method of claim 12, wherein the portion of the memory address is used to specify a bit position of the one or more control addresses and wherein the memory address is a match for a first control address if a bit is set at the specified bit position of the first control address and not a match if the bit is not set.

14. The method of claim 9, wherein the cache policies comprise cache replacement policies.

15. The method of claim 9, wherein the cache policies comprise cache line prefetch policies.

16. The method of claim 9, wherein the cache performance monitoring circuitry comprises a plurality of counters, each tracking occurrences of a particular cache event for a specific cache partition.

17. A system comprising:
a memory;
a processor comprising:
a plurality of cores;
a cache shared by the plurality of cores;
cache controller circuitry to partition the cache into a plurality of cache partitions based on one or more control addresses, the cache controller circuitry further to receive a request to access a memory address and responsively determine one of the plurality of cache partitions to which the memory address is assigned, wherein the memory address is assigned to a first cache partition if a portion of the memory address matches a first one of the one or more control addresses and assigned to a second cache partition if the portion of the memory address matches a second one of the one or more control addresses;
cache policy assignment circuitry to apply different cache policies to different subsets of the plurality of cache partitions; and
cache performance monitoring circuitry to track cache events separately for each of the cache partitions and to provide partition-specific statistics to allow comparison between the plurality of cache partitions as a result of applying the different cache policies in a same time period.

18. The system of claim 17, further comprising a plurality of machine specific registers (MSRs) to store the control address, the cache policies, and the partition-specific statistics.

19. The system of claim 17, wherein the memory address is assigned to a third cache partition if the portion of the memory address does not match any of the one or more control addresses.

20. The system of claim 17, wherein a mask is applied to the memory address to generate the portion of the memory address used for determining a match between the memory address and the one or more control addresses.

21. The system of claim 20, wherein the portion of the memory address is used to specify a bit position of the one or more control addresses and wherein the memory address is a match for a first control address if a bit is set at the specified bit position of the first control address and not a match if the bit is not set.

22. The system of claim 17, wherein the cache performance monitoring circuitry comprises a plurality of counters, each tracking occurrences of a particular cache event for a specific cache partition.

* * * * *